March 2, 1954
J. H. WILSON
2,670,751
QUICK-RELEASE AIR VALVE
Filed Sept. 12, 1950
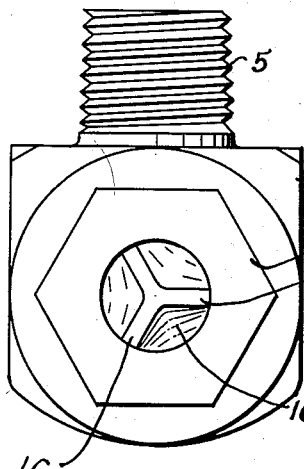
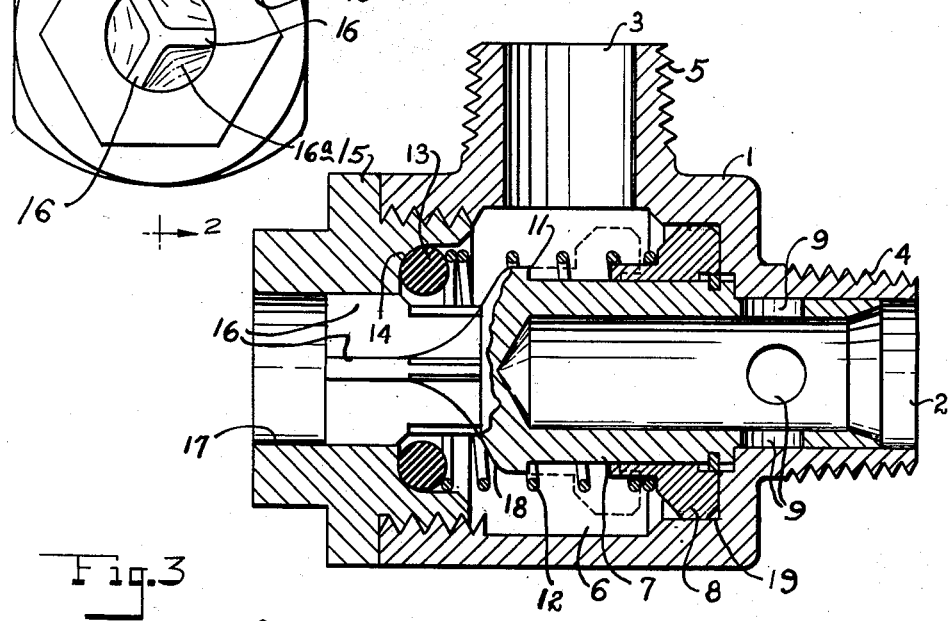
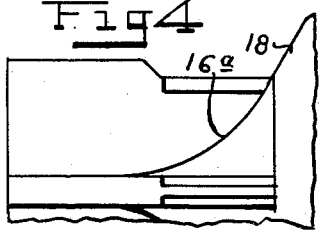
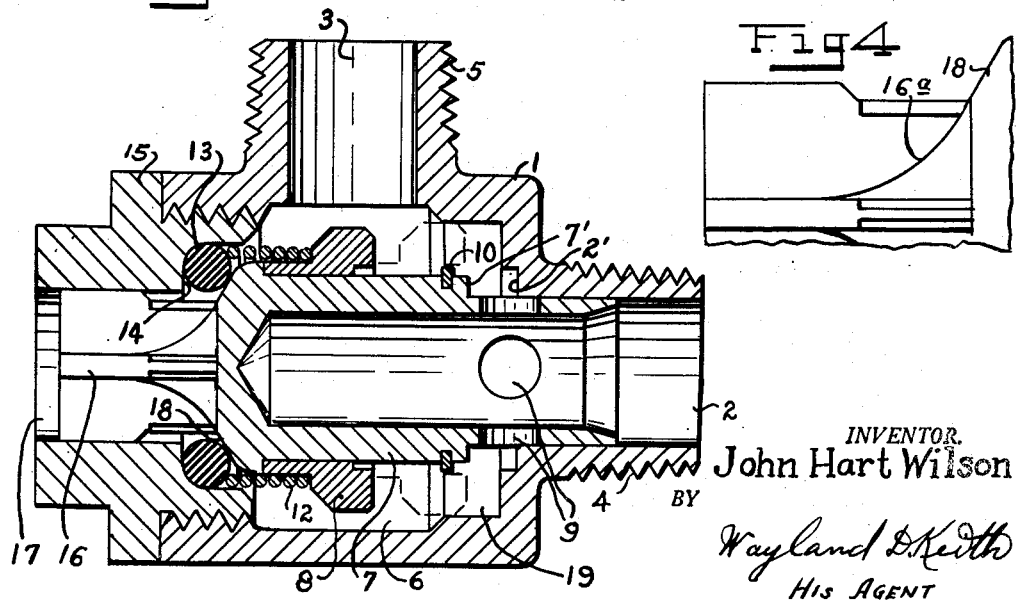
INVENTOR.
John Hart Wilson
BY
Wayland D. Keith
HIS AGENT Patented Mar. 2, 1954

2,670,751

UNITED STATES PATENT OFFICE 2,670,751

QUICK-RELEASE AIR VALVE

John Hart Wilson, Wichita Falls, Tex.

Application September 12, 1950, Serial No. 184,470

3 Claims. (Cl. 137—107)

This invention relates to a quick release valve, and more particularly to a quick release air valve structure also known as a dump valve to be used in fluid pressure operated systems, wherein the automatic release of fluid pressure in the shortest possible interval of time is an important factor in the functioning of the system.

The present valve is responsive to and controlled by the movement of air for actuating the valve for releasing the air from the system. Various quick release valves have been proposed heretofore, but these, for the most part, were complicated in construction, not dependable in operation, and could not withstand the rigorous, continuous use to which such valves are often subjected.

The present valve is simple in construction, the interior parts thereof may be assembled and disassembled without removal of the valve body from the line in the system, and the working parts repaired and replaced readily and in a very short time.

An object of this invention is to provide a quick release valve that may be accurately controlled by the application of or the release of air intermediate the source and the quick release valve, so as to produce the release of the bulk of the air from the device being operated without the air having to find its way back through the entire system to the point from whence it was introduced.

Another object of this invention is to provide a quick release air valve that is remotely controlled and that is capable of releasing air from the system in the shortest possible interval of time, upon releasing of the air in the line intermediate the control valve and the quick release valve.

Another object of this invention is to provide a quick release valve having the air outlet passage so shaped as to direct the air outward therefrom with a minimum of turbulence and back pressure in the shortest possible time.

A still further object of this invention is to provide a quick release air valve that has a removable seat or sealing element held in place by a spring so that the seat may be easily and readily replaced without removing the valve body from the piping or without replacing any other part of the valve.

It is preferable that the quick release air valve body be made of light material and that it be as compact as possible, as the valve is often used in conjunction with rotating elements such as clutches, or the like, wherein the weight of the air valve, when rotated at high speed, may tend to throw the clutch or fly wheel out of balance, therefore it is preferable that the valve be made of light weight material, such as aluminum or the like. Two or more of these valves may be so positioned as to dynamically balance the rotating element.

The invention will best be understood from the following detailed description constituting a specification of the same when taken in conjunction with the accompanying drawings, in which:

Fig. 1 is an end elevational view of the exhaust end of the valve;

Fig. 2 is a longitudinal sectional view taken on the line 2—2 of Fig. 1, looking in the direction indicated by the arrows, with certain parts shown in elevation and with parts broken away to illustrate the details of construction, and with portions shown in dashed outline to show relative movement of certain parts thereof;

Fig. 3 is a view of the invention somewhat similar to Fig. 2, but showing the air exhaust passage of the valve closed; and with the piston shown in full outline during the filling of the air actuated elements; and with the piston shown in dashed outline preparatory to exhausting the air;

Fig. 4 is a fragmentary detailed view showing the construction of the flutes in the exhaust end of the valve.

With more detailed reference to the drawing the numeral 1 designates a valve body having air inlet passage 2 formed in one portion thereof and a passage 3 for directing the air into the apparatus with which the valve is used.

The valve body 1 has outwardly protruding threaded connections 4 and 5 for connection with the air system and for connection with the apparatus with which the quick release air valve is to be used, so as to connect the inlet passage 2 and the passage 3 with their respective conduits.

The valve body is counterbored, as indicated at 6, to receive the sliding valve stem 7 and the spring pressed piston 8 which is slidably mounted on valve stem 7. The valve stem 7 is hollow and has lateral openings 9 in the sides thereof, which openings are adapted to form a sleeve valve for closing action with the inlet passage 2 when in position as shown in Fig. 2, and to form a passage into counterbore 6 and through passage 3 to the device to be operated, when in the position as indicated in Fig. 3. The valve stem 7 has a lock ring 10 therearound so as to retain sliding piston 8 in place on valve stem 7.

A shoulder 11 is provided on the valve stem 7 near the discharge end thereof for complementary engagement with piston 8, to enable the piston 8 and valve stem 7 to be moved against tension of spring 12 to seat upon O-ring 13 that is spring pressed by spring 12 into the recess 14 formed within the closure nut 15 that closes the end of the counterbore 6. The flutes 16 protrude outward from the valve stem 7 and are guided within bore 17 of the closure nut 15, as will best be seen in Figs. 1 and 3.

The stem 7 has a beveled face 18 that forms a complementary seat with O-ring 13 to seal off the exhaust passage while directing the air into the device to be actuated thereby.

The spring 12 also retains the O-ring within the seat, when the valve is in exhaust position. The spring 12 thereby serves the double purpose of returning the sliding piston 8 to the inlet end of the valve, and of retaining the O-ring in place, which eliminates the cementing or bonding of the O-ring to the valve. The cementing or bonding of valve seats in place has been found to be very unsatisfactory due to the cement or bond breaking and causing leaks thereunder and therearound. By having the valve seat or O-ring element pressed in by a spring it is possible to quickly remove and replace the O-ring seat element without having to wait for cement to dry, or to replace a major part to which the seat may be bonded, or cemented.

Operation

When the valve body 1 is installed with the threaded connection 5 connected to the apparatus to be actuated by air pressure, and the threaded connection 4 connected to the air inlet pipe, the valve, when not being used or when exhausting, will normally be in the position as shown in Fig. 2, in full outline. Upon the application of air the valve stem 7 will move against tension of the spring 12 to uncover ports 9, which will permit air to pass into bore 19 in the inlet end of the valve body, which air will direct pressure against piston 8 to move it against shoulder 11, and at the same time cause an increased pressure against valve stem 7 to move it into seating position as shown in Fig. 3, to close the air exhaust passage.

By releasing air from the air inlet line which is connected with passage 2, the pressure on the inlet side of the piston 8 will be less than on the opposite side, and this will move piston 8 toward the inlet end of the valve to engage lock ring 10, which is secured to valve stem 7, and causes the valve stem 7 to move toward the inlet end of the valve until shoulder 7' engages shoulder 2' in complementary seating relation, thus shutting off the connection to the inlet line, and at the same time, moves the valve face 18 away from seat 13 to permit air from a clutch or other air actuated element to pass quickly through passage 3, counterbore 6, and between valve face 18 and seat 13, through flutes 16 and thence outward through exhaust passage 17.

It is to be pointed out that one or more of these valves may be installed either in series or in parallel with an air actuated device, and a comparatively small line connected with the air supply system. While it might take several seconds to engage or actuate the device with air, the air may be exhausted therefrom in a fraction of the time that is required for the device to be initially actuated.

It is usually very desirable to release a clutch or other air actuated element as quickly as possible, and if one air exhaust valve installed in close proximity to the device is not sufficient, two or more such valves installed in series or in parallel will work equally well and be more effective than a single valve.

It is to be understood that the rubber seating element may be made comparatively large in comparison to the valve stem and requires no cementing to seal it in place, as the ring is retained in place by a spring which enables it to be readily removed.

Having thus clearly shown and described the invention, what is claimed as new and desired to secure by Letters Patent is:

1. A quick release fluid pressure valve mechanism comprising a casing provided with an inlet port, an outlet port and an exhaust port, a valve in said casing movable axially therein to control flow through said inlet and exhaust ports to alternatively establish communication between said inlet port and said outlet port and between said outlet port and said exhaust port, an annular piston valve element surrounding said valve and operable to shut off communication between said inlet port and said outlet port before communication is established between said outlet port and said exhaust port and mechanically independently of said valve actuation, a resilient annular seating ring in said casing, disposed against the inner wall thereof and around said exhaust port, a spring surrounding said movable valve, one end of said spring being seated on said resilient seating ring to hold same in place and the other end of said spring being in bearing relation with said piston valve element to urge the latter toward inlet flow closing position.

2. A quick release fluid pressure controlled valve device comprising a valve body provided with substantially axially aligned inlet and exhaust ports at the respective opposite ends thereof and an outlet port disposed transversely of the body, substantially axial bores in the valve body adjacent the respective inlet and exhaust ends of the body and a valve member having its ends guided for reciprocation therein, an enlarged counterbore within the central portion of the body of greater diameter than the intermediate portion of the valve member to afford great capacity of flow for rapid charging and discharging of fluid through said valve device, means at one end of said valve member cooperating with the valve body adjacent the inlet end for controlling inlet flow into the body and thence to said transverse outlet port, an annular valve seat surrounding the inward end of the bore at the exhaust end of the body and a cooperating annular valving surface on the corresponding end portion of the valve member, means carried by said valve member subject to both the inlet flow pressure and the outlet pressure within said body and operable upon a predetermined diminution of inlet pressure relative to the outlet pressure to cut off communication between the inlet and outlet ports even before the valve member moves to close the inlet port and open the exhaust port, the end of said valve member which extends outwardly beyond the said annular valve seat and into the exhaust port guide bore being longitudinally fluted, the flutes having a radial depth which varies along a transition curve from full diameter of the valve member adjacent the said exhaust valve surface to a maximum depth at the exhaust port, thus affording exhaust dumping of great volume and with a minimum of turbulence.

3. The valve device as set forth in claim 2 in which said annular exhaust valve seat comprises a resilient O-ring disposed against the inner wall of the valve body around the exhaust bore, and the said pressure operable means carried by the valve member comprising an annular valve piston surrounding the valve member and movable along the latter into and out of an enlarged recess concentric with the inlet bore, and a spring surrounding said valve member and compressed between said O-ring and said annular piston to retain the O-ring in place and at the same time bias the piston toward inlet flow closing position within the recess.

JOHN HART WILSON.

References Cited in the file of this patent

UNITED STATES PATENTS

| Number | Name | Date |
|---|---|---|
| 1,021,537 | Lawnin | Mar. 26, 1912 |
| 1,726,484 | Gleason | Aug. 27, 1929 |
| 2,282,188 | Horne | May 3, 1942 |
| 2,358,228 | Hoof | Sept. 12, 1944 |
| 2,360,839 | Barksdale | Oct. 24, 1944 |
| 2,371,293 | Hoof | Mar. 13, 1945 |
| 2,488,949 | Walsh | Nov. 22, 1949 |
| 2,512,479 | Callejo | June 20, 1950 |
| 2,524,951 | Ashton | Oct. 10, 1950 |
| 2,525,799 | Hecker | Oct. 17, 1950 |

FOREIGN PATENTS

| Number | Country | Date |
|---|---|---|
| 9,506 | Australia | of 1927 |
| 543,396 | Great Britain | of 1942 |